United States Patent [19]
Wywailowski et al.

[11] Patent Number: 4,662,398
[45] Date of Patent: May 5, 1987

[54] CONTROL VALVE FOR A STEAM BOX

[75] Inventors: Frank J. Wywailowski, Beloit, Wis.; Robert J. Orange, South Beloit, Ill.

[73] Assignee: Beloit Corporation, Beloit, Wis.

[21] Appl. No.: 847,909

[22] PCT Filed: Feb. 4, 1986

[86] PCT No.: PCT/US86/00269
§ 371 Date: Mar. 14, 1986
§ 102(e) Date: Mar. 14, 1986

[51] Int. Cl.⁴ ............................................. F16K 11/02
[52] U.S. Cl. ..................................... 137/625.4; 34/47; 34/114; 34/122; 137/625.49; 137/625.5; 162/207
[58] Field of Search ...................... 34/47, 54, 114, 122; 137/625.4, 625.49, 625.5; 162/207

[56] References Cited

U.S. PATENT DOCUMENTS

| | | | |
|---|---|---|---|
| 1,490,884 | 4/1924 | Spreen | 137/625.4 |
| 3,087,675 | 4/1963 | Honegger | 137/625.4 X |
| 3,488,030 | 1/1970 | Hulme et al. | 251/129.12 |
| 4,096,643 | 6/1978 | Futcher | 34/114 X |
| 4,253,247 | 3/1981 | Bergstrom | 34/54 X |
| 4,320,583 | 3/1982 | Dove | 34/54 |
| 4,351,700 | 9/1982 | Dove | 34/54 X |
| 4,358,900 | 11/1982 | Dove | 34/160 X |
| 4,398,355 | 8/1983 | Dove | 34/160 X |
| 4,580,355 | 4/1986 | Boissevain | 34/54 |

Primary Examiner—Gerald A. Michalsky
Attorney, Agent, or Firm—Dirk J. Veneman; Raymond W. Campbell; David J. Archer

[57] ABSTRACT

A control valve (22) is disclosed for controlled both the flow of steam (S) from a steam header (18) and air (A) into a steam box (12) of a web drying machine. The control valve (22) includes a valve body (26) defining a longitudinal passageway (28). The passageway (28) has a first and a second end (30,32) with the first end (30) of the passageway (28) being connected to, and in fluid communication with, the steam header (18). The second end (32) is connected to and in fluid communication with an air header (19). A first and a second valve seat (34,36) are disposed adjacent to the first and the second ends (30,32) of the passageway (28) for controlling respectively the flow of steam (S) and air (A) into the steam box (12). An elongate valve stem (38) having a first and a second valve closure (44,46) is movable axially within and along the passageway (28), the first and second closures (44,46) being disposed adjacent to a first and second end (40,42) of the valve stem (38). A stepping motor (48) is drivingly connected to the valve stem (38) for selectively moving the valve stem (38) axially relative to the passageway (28) such that when the valve stem (38) is moved, the change in flow of stem (S) into the steam box (12) is inversely proportional to the change in flow of air (A) through the second valve seat (36).

10 Claims, 10 Drawing Figures

1

CONTROL VALVE FOR A STEAM BOX

BACKGROUND OF THE INVENTION

1. FIELD OF THE INVENTION

This invention relates to a valve for controlling both the flow of steam from a steam header and air into a steam box of a web drying machine. More particularly, this invention relates to a control valve for the steam box of a paper drying machine for controlling the moisture profile of a paper web in the cross machine direction.

2. INFORMATION DISCLOSURE STATEMENT

In the papermaking art, paper or board is produced by supplying, under pressure, a jet of pulp or stock onto a moving screen. The pulp usually includes over 95% by weight, of water, and such water is removed by drainage through the moving forming screen. The resultant paper web is removed from the forming screen and is fed through a plurality of pressing rolls for removing excess quantities of water from the formed web. The pressed web is transferred from the press section to a drying section where the relatively moist web is fed around a plurality of rotating drying cylinders.

Due to variations of pressure applied by the press rolls in the cross machine direction during the pressing stage, and due to forming and drying variables, the web of paper entering the drying section will vary in moisture content along the width, or cross machine direction, of the moving web. Such variations in moisture content, or web profile, unless compensated for, will result in a paper web which will exhibit variable coating characteristics along the cross machine direction. Furthermore, by controlling the cross machine direction web moisture content, a much higher percentage of moisture can be allowed in the salable roll of paper. Also, optimum control of the cross machine direction web dryness will minimize the number of sheet breaks.

Consequently, much research has been carried out in order to compensate for such cross machine direction profile in order to provide a paper web having a relatively uniform moisture content along the width thereof. The steam box is disposed adjacent a rotating web guide roll which may be a suction roll or a suction box with the web passing around the web guide roll and disposed between the roll and the steam box. The steam box is supplied with steam from a steam header with the steam header extending longitudinally through the steam box. The steam box is divided into a plurality of equally-sized compartments which are disposed in side-by-side relationship across the width of the web such that steam can be individually and selectively supplied to one or more of the compartments. Steam within a compartment is diffused onto the adjacent portion of the moving web in order to effect a drying operation thereto. Monitoring means are disposed downstream of the steam box in order to ascertain the particular moisture content of the various portions of the width of the web. In accordance with control signals supplied by such monitoring means, steam is selectively supplied to one or more of the steam box compartments to compensate for any irregularity in the moisture profile of the moving web.

In copending application, Ser. No. 720,482 to Chance et al and assigned to Beloit Corporation, rather than merely providing a steam control valve for controlling the flow of steam from the header into the steam box, it has been found advantageous that when such flow of steam is to be reduced or terminated, a corresponding volume of air be admitted into the steam box. Such admission of compensating air has been found useful in not only increasing the sensitivity of the moisture profiling apparatus, but also has improved the smooth flow of steam into, or out of, the steam box.

Copending application, Ser. No. 720,482 to Chance et al and assigned to Beloit Corporation, is incorporated by reference into the present application.

In the aforementioned proposals of pending application, No. 720,482, a flow of air has necessitated the provision of a second valve with separate control means. Such second air control valve and control means have posed relatively complex control problems resulting in a relatively high cost of manufacture.

The present invention overcomes the inadequacies of the aforementioned devices and provides a control valve having a significant advantage over these earlier proposals, thereby contributing to a significant improvement in the art of paper web moisture profiling.

An object of the present invention is the provision of a control valve for moisture profiling having a valve stem with a first and second valve closure which is activated by a stepping motor such that when the valve stem is moved, the change in flow of steam into the steam box is inversely proportional to the change in flow of air into the steam box.

Another object of the present invention is the provision of a control valve in which, as the first valve is opened to admit steam into the steam box, the second valve for controlling the flow of air is proportionately closed to reduce the flow of air into the steam box compartment.

Another object of the present invention is the provision of a control valve in which, as the first valve is closed thereby cutting off the supply of steam to the steam box, the second valve is proportionately opened thereby admitting air into the steam box.

Other objects and advantages of the present invention will be readily apparent to those skilled in the art by reference to the detailed description, drawings and the appended claims.

SUMMARY OF THE INVENTION

This invention relates to a control valve for controlling both the flow of steam from a steam header and air into a steam box of a web drying machine. The control valve includes a valve body defining a longitudinal passageway. The passageway has a first and a second end with the first end of the passageway being connected to, and in fluid communication with, the steam header. The second end is connected to, and in fluid communication with, an air header. A first and a second valve seat are disposed adjacent to the first and second ends of the passageway for controlling, respectively, the flow of steam and air into the steam box. An elongate valve stem is movable axially within and along the passageway and the valve stem has a first and a second end. A first valve closure is disposed adjacent to the first end of the valve stem for cooperating with the first valve seat for selectively controlling the flow of steam from the steam header into the steam box. A second valve closure is disposed adjacent to the second end of the valve stem for cooperating with the second valve seat for selectively controlling the flow of air into the steam box. A stepping motor is drivingly connected to the valve stem for selectively moving the valve stem axially relative to the passageway such that when the valve stem is moved, the change in flow of steam into the steam box is inversely proportional to the change in flow of air into the steam box compartment.

In a more specific embodiment of the present invention, a first channel is defined by the valve body with the first channel being disposed transversely relative to the passageway and adjacent to the first valve seat such that when the first valve closure moves axially away from the first valve seat, steam flows from the steam header through the first valve seat and through the first channel into the steam box.

Furthermore, the control valve is connected to the steam header and to the steam box such that the valve is not affected by thermal distortion and stresses between the steam header and steam box.

The second channel is defined by the valve body means with the second channel being disposed transversely relative to the passageway means and adjacent to the second valve seat such that when the second valve closure moves axially away from the second valve seat, air flows through the second valve seat and through the second channel into the steam box.

In an alternative embodiment of the present invention, the valve stem is actuated by means of a pneumatic diaphragm disposed within a pneumatic cylinder.

In a further embodiment of the present invention, a powered ram is connected by a pivotally-mounted linkage to the valve stem such that actuation of the ram moves the valve stem axially for opening or closing the valve closures.

In a preferred embodiment of the present invention, the valve body means is of unitary construction with the valve body being rigidly secured to the steam header.

In various alternative embodiments of the present invention, the valve body means includes a first and a second valve body portion with the first valve body portion being secured to the steam header and the second valve body portion being connected to the steam box.

The present invention is not limited to the detailed description of the preferred embodiment of the present invention to be described hereinafter or by the annexed drawings, but rather by the appended claims which define the scope of the present invention. Various modifications may be made to the preferred embodiment or the alternative embodiments described in the detailed description without departing from the spirit and scope of the present invention as defined by the appended claims. Although this invention has been described particularly with reference to the moisture profiling of a web of paper moving through a paper machine, it will be evident to those skilled in the art that the present control valve can be equally applied to a steam box for controlling the moisture profile in any moving web.

BRIEF DESCRIPTION OF THE DRAWINGS

Similar reference numerals used throughout the various figures of the drawings indicate similar parts relative to the various embodiments of the present invention.

DETAILED DESCRIPTION

This invention relates to a control valve for controlling both the flow of steam from a steam header and air into a steam box of a web drying machine. A plurality of such control valves is disposed along the width of a paper web with each control valve being disposed adjacent to a corresponding compartment of the steam box.

For the sake of clarity in describing the control valve of the present invention, it should be appreciated that the following description describes the arrangement and operation of a steam and air valve within a single compartment, but that in carrying out the application of the present invention, a plurality of such steam and air valves will be disposed along the cross machine direction of the paper web with each control valve being disposed within a corresponding steam box compartment.

Figure 1:
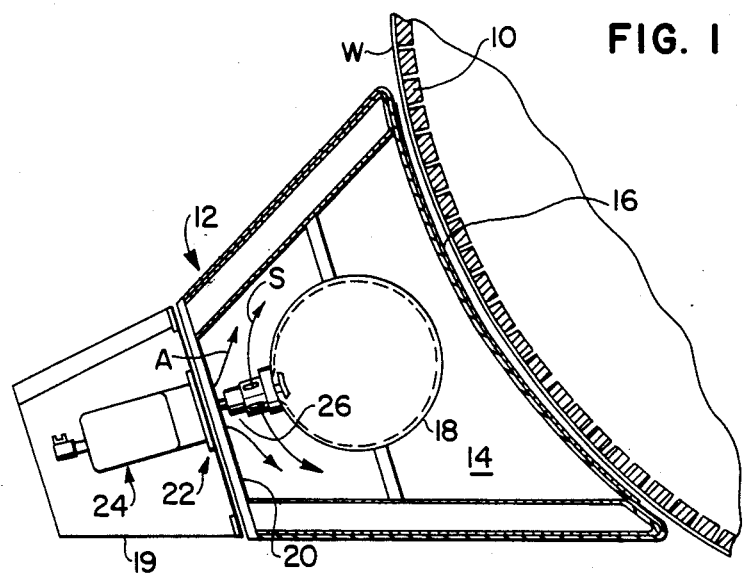
FIG. 1 is a sectional view of a moisture profiling steam box showing a web guide roll, a paper web, a steam box, a steam header and a control valve according to one embodiment of the present invention.

FIG. 1 shows a web guide or suction roll, or suction box 10 with a web of paper W being guided around the guide roll 10. A steam box generally designated 12 extends longitudinally along the width of the guide roll 10, the steam box 12 being divided into a plurality of side-by-side compartments. One of these compartments 14 is shown in FIG. 1 and includes a diffusion plate 16 which closely conforms to the peripheral configuration of the guide roll 10 such that the web W moves with the guide roll 10 between the guide roll 10 and the diffusion plate 16. A longitudinal steam header 18 extends through, and along the length of the steam box 12 such that the steam header 18 extends through each of the compartments. FIG. 1 shows the steam header 18 extending through the compartment 14. The compartment 14 includes a back plate 20 and a control valve generally designated 22 of the present invention is disposed between the back plate 20 and the steam header 18. A valve actuating means generally designated 24 is rigidly secured to the back plate 20.

Figure 2:
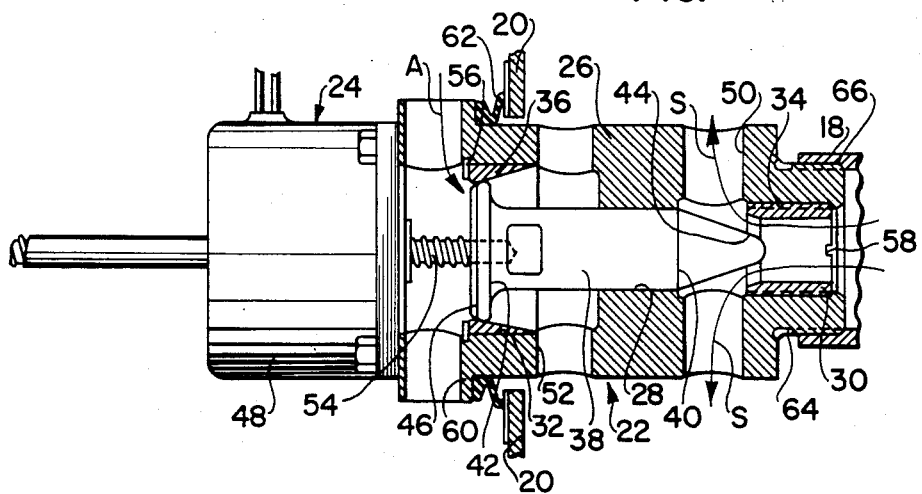
FIG. 2 is a sectional view of a control valve and stepping motor according to a preferred embodiment of the present invention.

FIG. 2 is a sectional view of a preferred embodiment of the present control valve generally designated 22 in FIG. 1. The control valve 22 controls both the flow of steam indicated by the arrow S from the steam header 18 and air indicated by the arrow A into the steam box 12 of a web drying machine.

The control valve 22 includes a valve body means generally designated 26 which is disposed adjacent to the steam box 12. In the particular embodiment shown in FIG. 2, the valve body means 26 is rigidly secured to the steam header 18 with the valve body means 26 being disposed between the back plate 20 and the steam header 18.

The valve body means 26 defines a longitudinal passageway means 28. The passageway means 28 has a first and a second end 30 and 32 respectively with the first end 30 of the passageway means 28 being connected to, and in fluid communication with, the steam header 18. The second end is connected to, and in fluid communication with, an air header 19. A first and second valve seat 34 and 36 are disposed adjacent to the first and second ends 30 and 32 of the passageway means 28 for controlling respectively the flow of steam S and air A into the steam box 12.

An elongate valve stem 38 is movable axially within, and along the passageway means 28. The valve stem 38 has a first and a second end 40 and 42 respectively.

A first valve closure 44 is disposed adjacent to the first end 40 of the valve stem 38 for cooperating with the first valve seat 34 for selectively controlling the flow of steam S from the steam header 18 into the steam box 12.

A second valve closure 46 is disposed adjacent to the second end 42 of the valve stem 38 for cooperating with the second valve seat 36 for selectively controlling the flow of air A into the steam box 12.

A stepping motor 48 is drivingly connected to the valve stem 38 for selectively moving the valve stem 38 axially relative to the passageway means 28 such that when the valve stem 38 is moved, the change in flow of steam S into the steam box 12 is inversely proportional to the change in flow of air A into the steam box compartment 14.

As shown in FIG. 2, the valve body means 26 also includes a first channel 50 which is defined by the valve body means 26. A first channel 50 is disposed transversely relative to the passageway means 28 and adjacent to the first valve seat 34 such that when the first valve closure 44 moves axially away from the first valve seat 34, steam S flows from the steam header 18 through the first valve seat 34 and through first channel 50 into the steam box 12.

A second channel 52 is defined by the valve body means 26 with the second channel 52 being disposed transversely relative to the passageway means 28 and adjacent to the second valve seat 36 such that when the second valve closure 46 moves axially away from the second valve seat 36, air A flows through the second valve seat 36 and through the second channel 52 into the steam box compartment 14.

The stepping motor 48 threadably cooperates with a control rod 54 which extends through the stepping motor 48. The control rod 54 is connected to the valve stem 38 such that when the stepping motor 48 is actuated, the control rod 54 is moved axially by the stepping motor 48 thereby moving the valve stem 38 axially relative to the passageway means 28 for controlling the passage of steam S and air A into the steam box compartment 14.

More particularly, with reference to FIG. 2, the second valve seat 36 is shown as a separate, internally-tapered ring fixedly secured by means of a circlip 56 adjacent to the second end 32 of the passageway means 28.

The first valve seat 34, however, is threadably engaged within the first end 30 of the passageway means 28 such that the axial position of the first seat 34 may be adjusted relative to the first valve closure 44. Such adjustment of the first valve seat 34 is effected by means of a screw notch 58.

The valve body means 26 includes a flange 60 which cooperates with an annular seal 62 such that the valve body means 26 sealingly engages the back plate 20 of the steam box 12. This allows the back plate 20 to distort, due to thermal stress, without imposing stress on the valve body means 26. As shown in FIG. 2, the valve body means 26 includes a threaded portion 64 which cooperates with an internally-threaded outlet 66 of the steam header 18 so that the valve body means 26 and stepping motor 48 are rigidly secured to the steam header 18.

Figure 3:
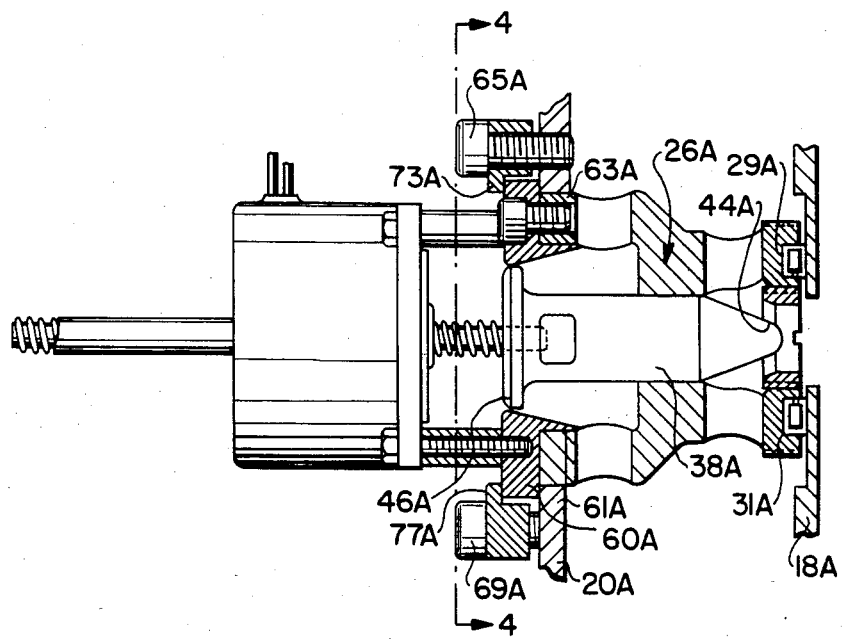
FIG. 3 is a sectional view of a control valve and stepping motor similar to that shown in FIG. 2 but having a different valve body mounting arrangement to that shown in the embodiment of FIG. 2.

FIG. 3 is a second embodiment of the present invention, but is similar to the embodiment shown in FIG. 2 and shows an alternative means for securing the valve body means to the back plate of the steam box.

Throughout the various alternative embodiments of the present invention, similar parts are indicated by the same numerals but with an alphabetical suffix added thereto.

More particularly, FIG. 3 shows the valve body means 26A. The valve body means 26A defines a seal groove 29A which cooperates with an annular face seal 31A such that the valve body means 26A sealingly engages the header 18A but allows the header 18A to distort, due to thermal stress, without imposing stress on the valve body means 26A.

Furthermore, FIG. 3 shows a valve stem 38A having a first and a second valve closure 44A and 46A respectively. The valve body means 26A includes a peripheral flange 60A which abuts against a shoulder 61A of a back plate orifice 63A.

Figure 4:
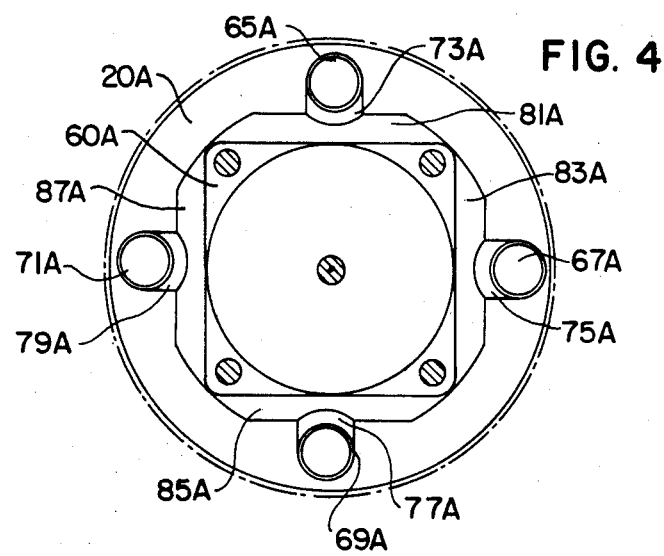
FIG. 4 is a sectional view taken on the line 4—4 of FIG. 3 showing the means for mounting the valve body within the steam box.

As shown more particularly in FIG. 4 which is a view taken on the line 4—4 of FIG. 3, threaded bolts 65A, 67A, 69A and 71A threadably engage the back plate 20A such that winged collars 73A, 75A, 77A and 79A engage the outer peripheral edges 81A, 83A, 85A and 87A of the flange 60A to lock the valve body means 26A against the back plate 20A.

Figure 5:
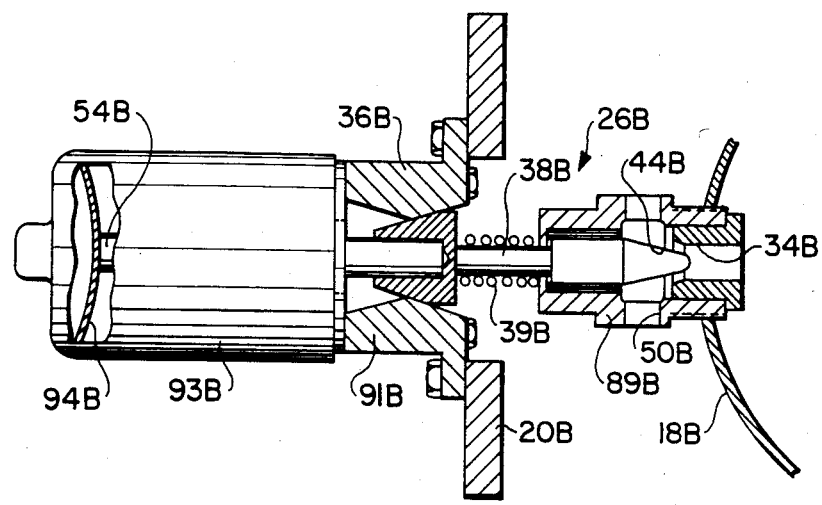
FIG. 5 shows a third embodiment of the present invention in which the valve body means includes a first valve body portion secured to the steam header and a second valve body portion secured to the steam box back plate.

FIG. 5 shows a third embodiment of the present invention in which the valve body means 26B includes a first valve body portion 89B rigidly secured to the steam header 18B and a second valve body portion 91B rigidly secured to the back plate 20B of the steam box. A pneumatic diaphragm actuating means 93B including a pneumatic diaphragm 94B is shown in FIG. 5 for moving a control rod 54B such that the valve stem 38B moves axially relative to the first and second valve seats 34B and 36B. The diaphragm actuating means 93B may be of the type sold under the registered trade name BELLOFRAM.

The control rod 54B pushes on the valve stem 38B but is not connected to the valve stem 38B. The valve stem 38B is pushed against the control rod 54B by means of a spring 39B.

Figure 6:
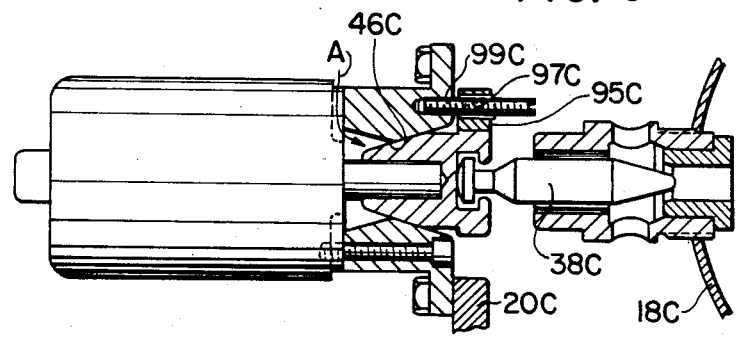
FIG. 6 is a fourth embodiment of the present invention and shows a first and second valve stem portion with the first and the second valve stem portions being flexibly connected to each other and guide means on the second valve stem portion for preventing rotation of the second valve stem portion.

FIG. 6 shows a fourth embodiment of the present invention in which the second valve closure 46C includes an extension 95C. The extension 95C defines a bore 97C which slidably cooperates with a stud 99C for guiding the second valve closure 46C coaxially relative to the valve stem 38C. The second valve closure 46C is flexibly connected to the valve stem 38C in order to absorb thermal stresses and distortion between the steam header 18C and the back plate 20C.

Figure 7:
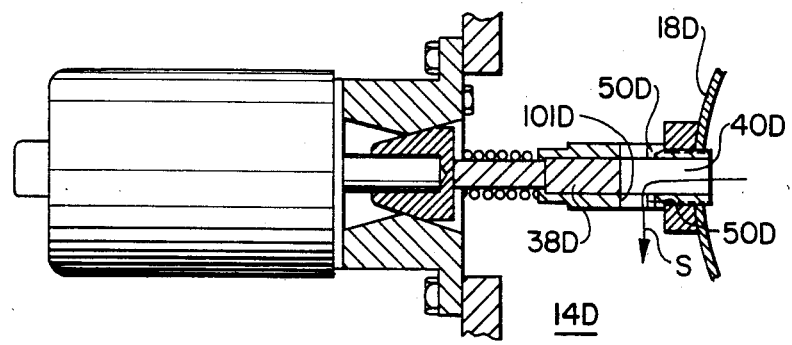
FIG. 7 discloses a fifth embodiment of the present invention in which the first valve closure includes a port defined by the first end of the valve stem, the port cooperating with a first transverse channel of the valve body means.

FIG. 7 shows a fifth embodiment of the present invention in which the flow of steam S from the steam header 18D into the steam box compartment 14D is controlled by the axial position of the valve stem 38D relative to the ports 101D of the first transverse channel 50D. The ports 101D, which are defined by the valve body means 26D are in fluid communication with the steam header 18D when the valve stem 38D uncovers the ports 101D.

Figure 8:
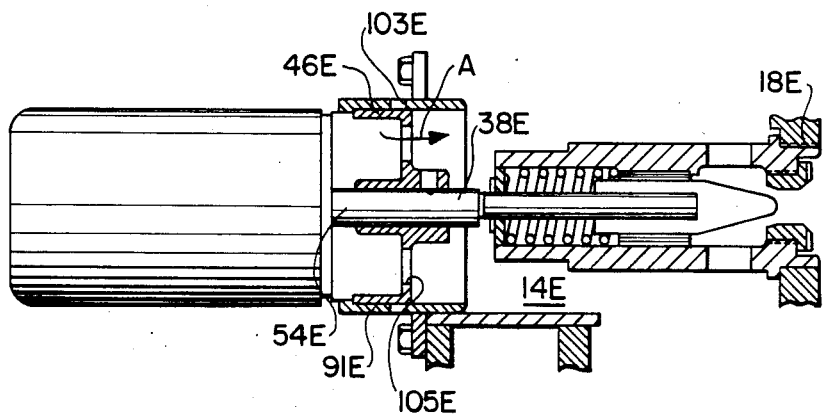
FIG. 8 is a sixth embodiment of the present invention in which the second valve closure is a piston which cooperates with the second valve body portion for controlling the flow of air into the steam box.

FIG. 8 shows a sixth embodiment of the present invention and includes a second valve body portion 91E which is of generally cylindrical configuration. A piston type second valve closure 46E is rigidly connected to the end of control rod 54E. Air intakes 103E are defined by the second body portion 91E such that as the second valve closure 46E is moved axially towards the steam header 18E, the air intakes 103E are uncovered thereby permitting a flow of air A through the air intake 103E and through a plurality of openings 105E in fluid communication with the inside of the steam box compartment 14E.

Figure 9:
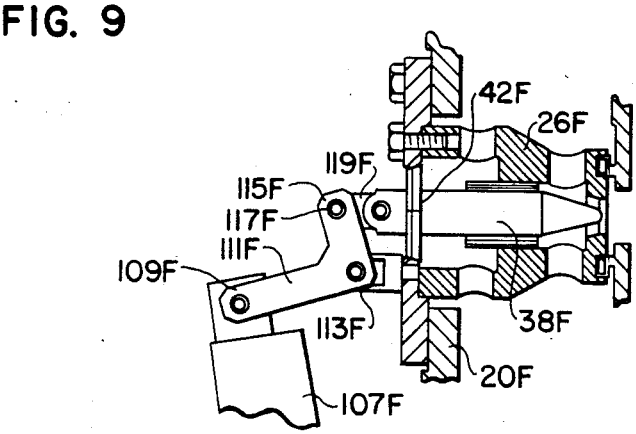
FIG. 9 is a seventh embodiment of the present invention with the valve stem being moved axially by means of a ram and intervening linkage means.

FIG. 9 shows a seventh embodiment of the present invention in which the valve stem 38F is moved relative to the valve body means 26F by means of a ram 107F pivotally connected to the second end 109F of a linkage arm 111F pivotally connected to the back plate 20F at 113F. A first end 115F of the linkage arm 111F is pivotally connected at 117F to a connecting means 119F. The connecting means 119F extends between a first end 115F of the linkage arm 111F and the second end 42F of the valve stem 38F.

Figure 10:
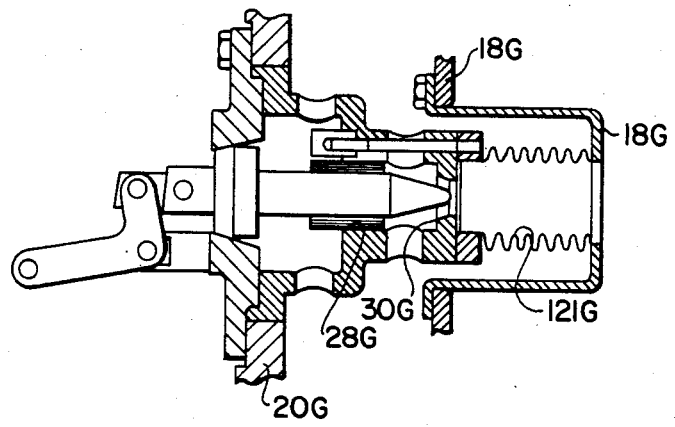
FIG. 10 is an eighth embodiment of the present invention which is similar to the embodiment shown in FIG. 9 and shows a particular bellows arrangement for connecting the first end of the passageway to the steam header.

FIG. 10 shows an eighth embodiment of the present invention in which the first end 30G of the passageway means 28G is connected to the steam header 18G by means of a flexible bellows arrangement 121G. The bellows arrangement 121G allows for distortion and thermal stress between the steam header 18G and the back plate 20G.

In operation of the control valve 22, according to the present invention, and as disclosed in each of the foregoing eight embodiments thereof, an actuating means 24 moves the valve stem 38 axially relative to the valve body means 26 so that steam S is admitted into the compartment 14. Conversely, as the valve stem 38 is moved towards the steam header 18, the second valve closure 46 is lifted from the second valve seat 36 thereby admitting the flow of air A into the compartment 14.

The present invention provides a unique means for simultaneously controlling the flow of steam and air relative to a steam box in a paper web drying machine and furthermore avoids the necessity of providing a separate steam and air valve with attendant independent control devices. Also, by the various means used to mount the valve means relative to the steam header and the back plate, distortion and thermal stress between the steam header and the back plate of the steam box is allowed for and will not interfere with the efficient operation of the combined steam and air valve.

The control valve of the present invention not only greatly simplifies the provision of a cross machine direction moisture profile apparatus, but also provides a control valve that inhibits the flow of steam between adjacent compartments.

What we claim is:

1. A valve for controlling both the flow of steam from a steam header and air from an air header into a steam box of a web drying machine, said valve comprising in combination:

valve body means disposed adjacent to the steam header for controlling the flow of steam and air relative to the steam box;

longitudinal passageway means defined by said valve body means, said passageway means having a first and a second end, said first and second ends of said passageway means being connected to, and in fluid communication with respectively, the steam header and the air header for the passage therethrough of steam and air;

a first and second valve seat disposed adjacent to said first and second ends respectively of said passageway means for controlling respectively the flow of steam and air into the steam box;

an elongate valve stem movable axially within and along said passageway means, said valve stem having a first and second end;

a first valve closure disposed adjacent to said first end of said valve stem for cooperating with said first valve seat for selectively controlling the flow of steam from the steam header into the steam box;

a second valve closure disposed adjacent to said second end of said valve stem for cooperating with said second valve seat for selectively controlling the flow of air into the steam box; and valve actuating means drivingly connected to said valve stem for selectively moving said valve stem axially relative to said passageway means such that when said valve stem is moved, the change in flow of steam into the steam box is inversely proportional to the change in flow of air through said second valve seat, so that when said first valve closure is progressively opened relative to said first valve seat, flow of steam into the steam box is increased and said second valve closure is progressively closed relative to said second valve seat to correspondingly reduce the flow of air into the steam box, and when said first valve closure is progressively closed relative to said first valve seat, flow of steam into the steam box is reduced and flow of air into the steam box is correspondingly increased.

2. A valve as set forth in claim 1 wherein said valve body means is disposed within the steam box.

3. A valve as set forth in claim 2 wherein said valve body means further includes:

a first channel defined by said valve body means, said first channel being disposed transversely relative to said passageway means and adjacent to said first valve seat such that when said first valve closure moves axially away from said first valve seat, steam flows from the steam header through said first valve seat and through said first channel into the steam box; and a second channel defined by said valve body means, said second channel being disposed transversely relative to said passageway means and adjacent to said second valve seat such that when said second valve closure moves axially away from said second valve seat, air flows from the air header through said second valve seat and through said second channel into the steam box.

4. A valve as set forth in claim 3 wherein said valve body means is of unitary construction.

5. A valve as set forth in claim 3 wherein said valve body means includes:

a first valve body portion rigidly secured to the steam header;

a second valve body portion rigidly secured to the steam box.

6. A valve as set forth in claim 1 wherein said valve actuating means further includes:

a stepping motor secured to said valve body means;

a control rod threadably cooperating with said stepping motor such that when said stepping motor is actuated, said control rod moves axially relative to said passageway means:

means for connecting said control rod to said valve stem such that when said stepping motor is actuated, said first and second valve closures are moved relative to said first and second valve seats.

7. A valve as set forth in claim 1 wherein said valve actuating means further includes;

a pneumatic actuating means rigidly secured to the steam box;

a pneumatic diaphragm disposed within said pneumatic actuating means;

a control rod secured to said pneumatic diaphragm and extending between said diaphragm and said valve stem such that actuation of said diaphragm selectively controls axial movement of said valve stem for controlling the flow of steam and air into the steam box.

8. A valve as set forth in claim 1 wherein said valve actuating means includes:

linkage means pivotally connected to said valve body means, said linkage means having a first and a second end;

connecting means pivotally connected to said first end of said linkage means, said connecting means extending between said first end of said linkage means and said valve stem;

a ram pivotally connected to said second end of said linkage means such that when said ram is actuated said linkage means and connecting means cooperate together to move said valve stem axially relative to said first and second valve seats.

9. A valve for controlling both the flow of steam from a steam header and air from an air header into a steam box of a web drying machine, said valve comprising in combination:

a valve body means disposed adjacent to the steam header for controlling the flow of steam and air relative to the steam box;

longitudinal passageway means defined by said valve body means, said passageway means having a first and a second end, said first and second ends of said passageway means being connected to, and in fluid communication with respectively, the steam header and the air header for permitting the passage therethrough of steam and air;

a first and second valve seat disposed adjacent to said first and second ends of said passageway means for controlling respectively the flow of steam and air into the steam box;

an elongate valve stem movable axially within and along said passageway means, said valve stem having a first and a second end;

a first valve closure disposed adjacent to said first end of said valve stem for cooperating with said first valve seat for selectively controlling the flow of steam from the steam header into the steam box;

a second valve closure disposed adjacent to said second end of said valve stem for cooperating with said second valve seat for selectively controlling the flow of air into the steam box; and a stepping motor drivingly connected to said valve stem for selectively moving said valve stem axially relative to said passageway means such that when said valve stem is moved, the change in flow of steam into the steam box is inversely proportional to the change in the flow of air through said second valve seat so that when said first valve closure is progressively opened relative to said first valve seat, flow of steam into the steam box is increased and said second valve closure is progressively closed relative to said second valve seat to correspondingly reduce the flow of air into the steam box, and when said first valve closure is progressively closed relative to said first valve seat, flow of steam into the steam box is reduced and flow of air into the steam box is correspondingly increased.

10. A valve for controlling both the flow of steam from a steam header and air into a steam box of a web drying machine, said valve comprising in combination:

a valve body secured between the steam box and the steam header such that distortion between the steam box and the steam header due to thermal stresses is allowed for, said valve body defining a longitudinal passageway;

said passageway having a first and second end, said first and second ends of said passageway being connected to, and in fluid communication with respectively, the steam header and an air header;

a first and second valve seat disposed adjacent to said first and second ends of said passageway for controlling respectively, the flow of steam and air into the steam box;

an elongate valve stem movable axially within and along said passageway, said valve stem having a first and a second end;

a first valve closure disposed adjacent to said first end of said valve stem for cooperating with said first valve seat for selectively controlling the flow of steam from the steam header into the steam box;

a second valve closure disposed adjacent to said second end of said valve stem for cooperating with said second valve seat for selectively controlling the flow of air into the steam box; and a stepping motor drivingly connected to said valve stem for selectively moving said valve stem axially relative to said passageway such that when said valve stem is moved, the change in flow of steam into the steam box is inversely proportional to the change in flow of air through said second valve seat, so that when said first valve closure is progressively opened relative to said first valve seat, flow of steam into the steam box is increased and said second valve closure is progressively closed relative to said second valve seat, to correspondingly reduce the flow of air into the steam box, and when said first valve closure is progressively closed relative to said first valve seat, flow of steam into the steam box is reduced and flow of air into the steam box is correspondingly increased.

* * * * *